May 24, 1960  K. RANDER ET AL  2,937,568
EXPOSURE METER CONSTRUCTION

Filed Feb. 21, 1957  4 Sheets-Sheet 1

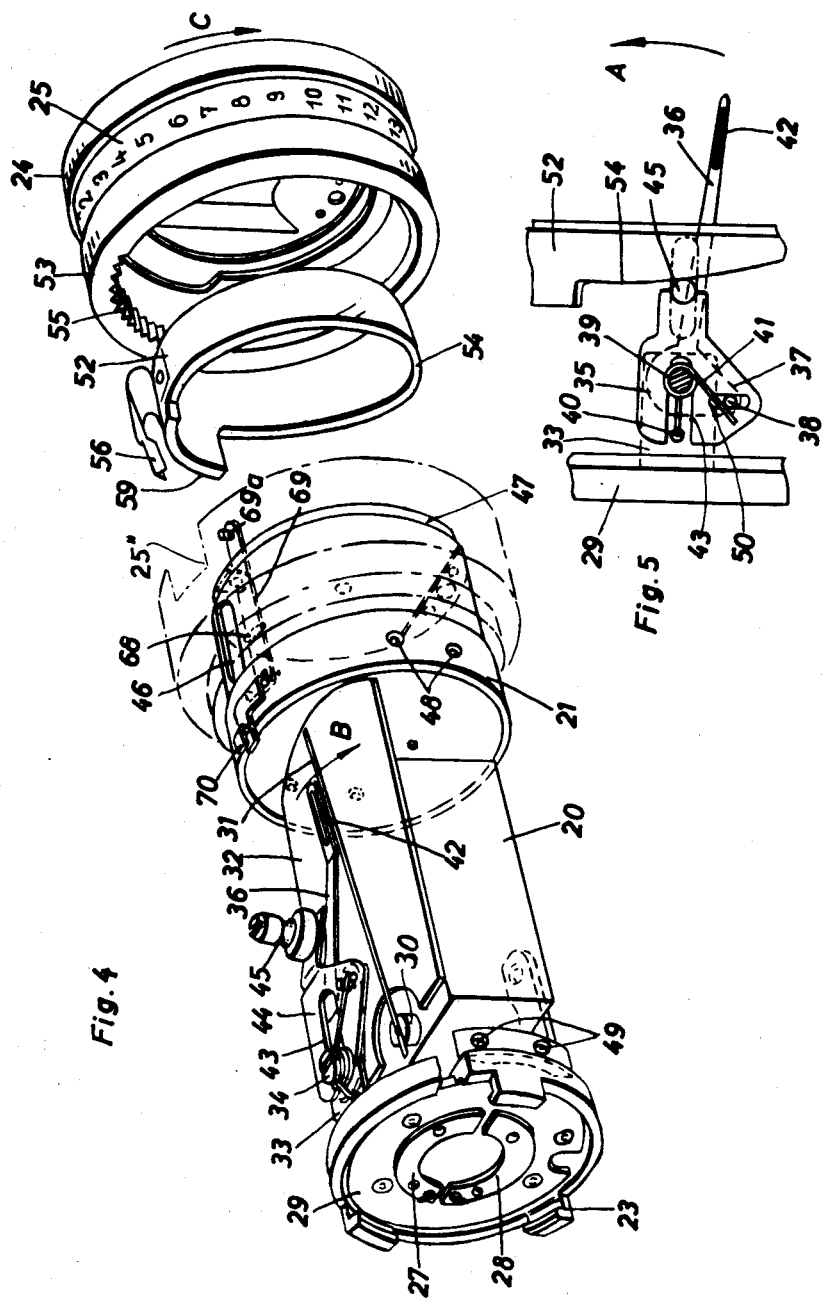

May 24, 1960  K. RANDER ET AL  2,937,568
EXPOSURE METER CONSTRUCTION
Filed Feb. 21, 1957  4 Sheets-Sheet 4

2,937,568
United States Patent Office
Patented May 24, 1960

2,937,568
EXPOSURE METER CONSTRUCTION

Karl Rander, Braunschweig, and Fritz Falkenburg, Erlangen, Germany, assignors to Franke & Heidecke, Fabrik Photographischer Präzisions-Apparate, Braunschweig, Germany, a firm of Germany Filed Feb. 21, 1957, Ser. No. 641,727

Claims priority, application Germany June 29, 1956

5 Claims. (Cl. 88—23)

This invention relates to an exposure meter, especially one of the follow-up type (that is, one in which a photoelectric cell controls the position of one pointer or needle, and a second pointer or needle is manually controlled to follow-up the movements of the first needle and to be brought into a predetermined position with respect to the first needle) especially but not exclusively when the meter is built into a photographic camera.

An object of the invention is the provision of a generally improved and more satisfactory exposure meter.

Another object is the provision, in an exposure meter having a plurality of sensitivity ranges, of simplified means for insuring correct reading of the meter according to whether one or the other sensitivity range is used.

Still another object is the provision of an improved form of meter extending laterally from a side wall of the camera to which it is attached, and having a plurality of observation windows through which the meter scale is to be read, one or the other window being used in accordance with the particular sensitivity range of the photoelectric cell which is being employed at the moment, both windows being in convenient position for observation when holding the camera approximately in normal position for taking a picture.

A further object is the provision of an exposure meter of the follow-up type, in which the follow-up pointer swings on a pivotal axis extending in one direction, and the manual control member for moving the follow-up pointer turns on a rotary axis approximately perpendicular to the pivotal axis of the pointer, and in which a single control cam is used for moving the follow-up pointer through its entire range of travel, notwithstanding the use of different sensitivity ranges of the photoelectric cell.

These and other desirable objects may be attained in the manner disclosed as an illustrative embodiment of the invention in the following description and in the accompanying drawings forming a part hereof, in which:

Fig. 4 is an exploded perspective view of the exposure meter removed from the camera;

Fig. 5 is a plan of certain parts shown in Fig. 4; and

The same reference numerals throughout the several views indicate the same parts.

Figure 1:
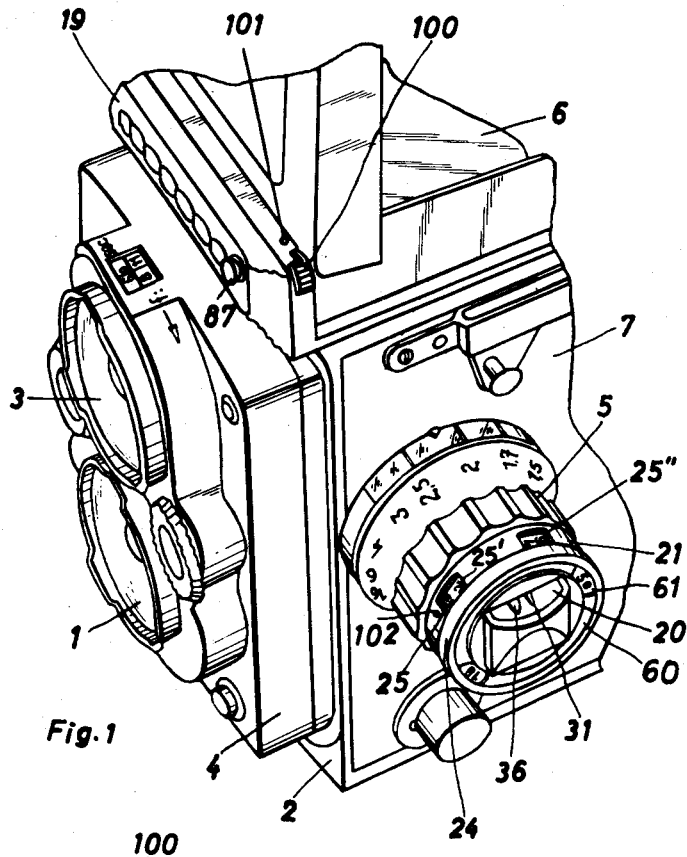
Fig. 1 is a fragmentary perspective view of a camera equipped with an exposure meter in accordance with the present invention, with parts broken away.

By way of example, but not by way of limitation, the invention may be described in connection with a twin lens reflex camera which, except for the exposure meter arrangement herein disclosed, may be, for example, the well known camera manufactured by the firm of Franke & Heidecke, in Braunschweig, Germany, under the trademark "Rolleiflex" and widely known and used throughout the United States of America and elsewhere. The following description presupposes that the reader will have general familiarity with the construction of a "Rolleiflex" camera. It comprises a main camera body 2 of generally rectangular shape, having a movable front or lens carrier element 4 shiftable forwardly and backwardly in the direction of the optical axis for purposes of focusing, by means of a focusing knob 5 rotatably mounted on the left side wall 7 of the camera body. The camera front member or lens carrier supports a lower or picture taking lens 1 and an upper or finder lens 3, the image of the latter being reflected upwardly by the usual mirror arranged angularly within the finder chamber above the picture taking chamber, so that the image of the field of view of the camera appears on the horizontal ground glass plate or focusing screen 6 at the top of the camera. The usual folding hood, partially shown in Fig. 1, surrounds the focusing screen 6 in upstanding relation thereto in order to shade the focusing screen from direct light, while the camera is in use, and the focusing hood may be folded down to a collapsed position over the screen 6, when not in use.

Figure 3:
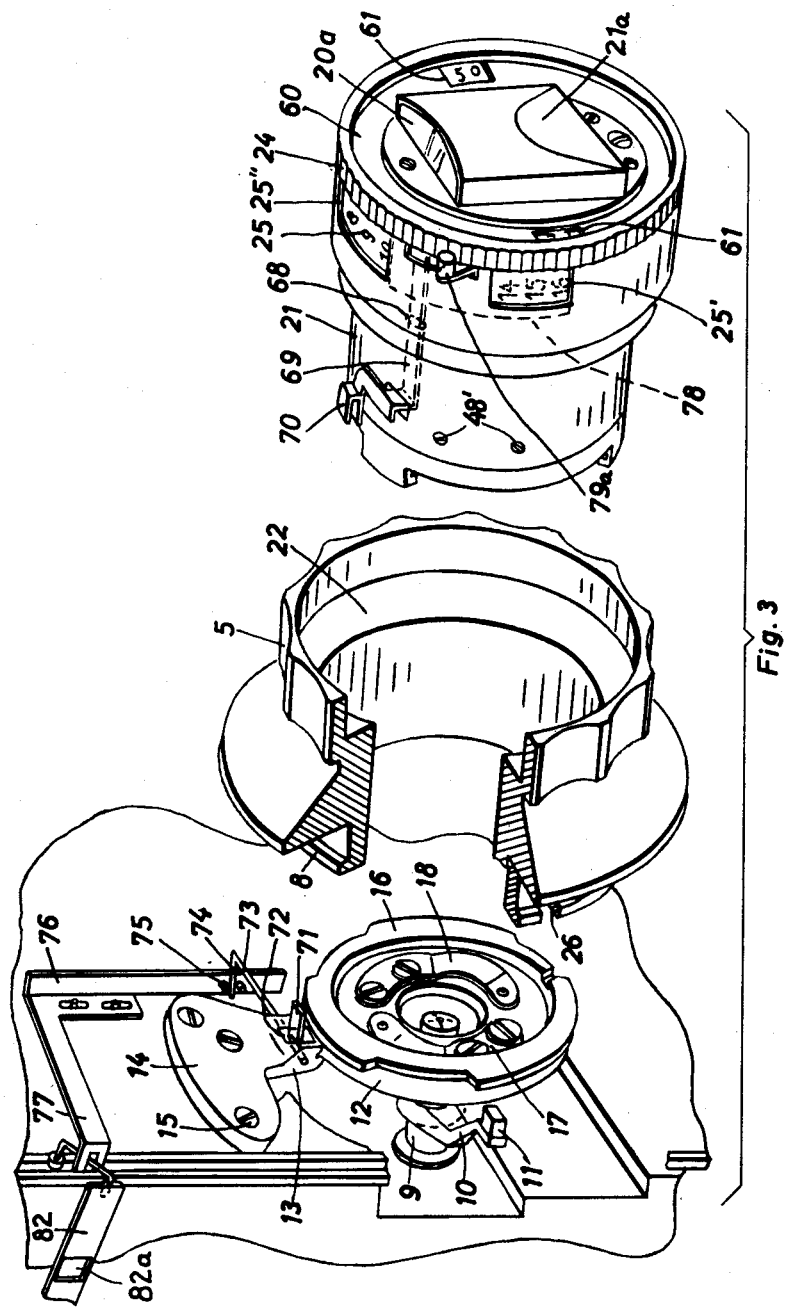
Fig. 3 is an exploded perspective view of part of the meter and associated parts on the camera.
Figure 6:
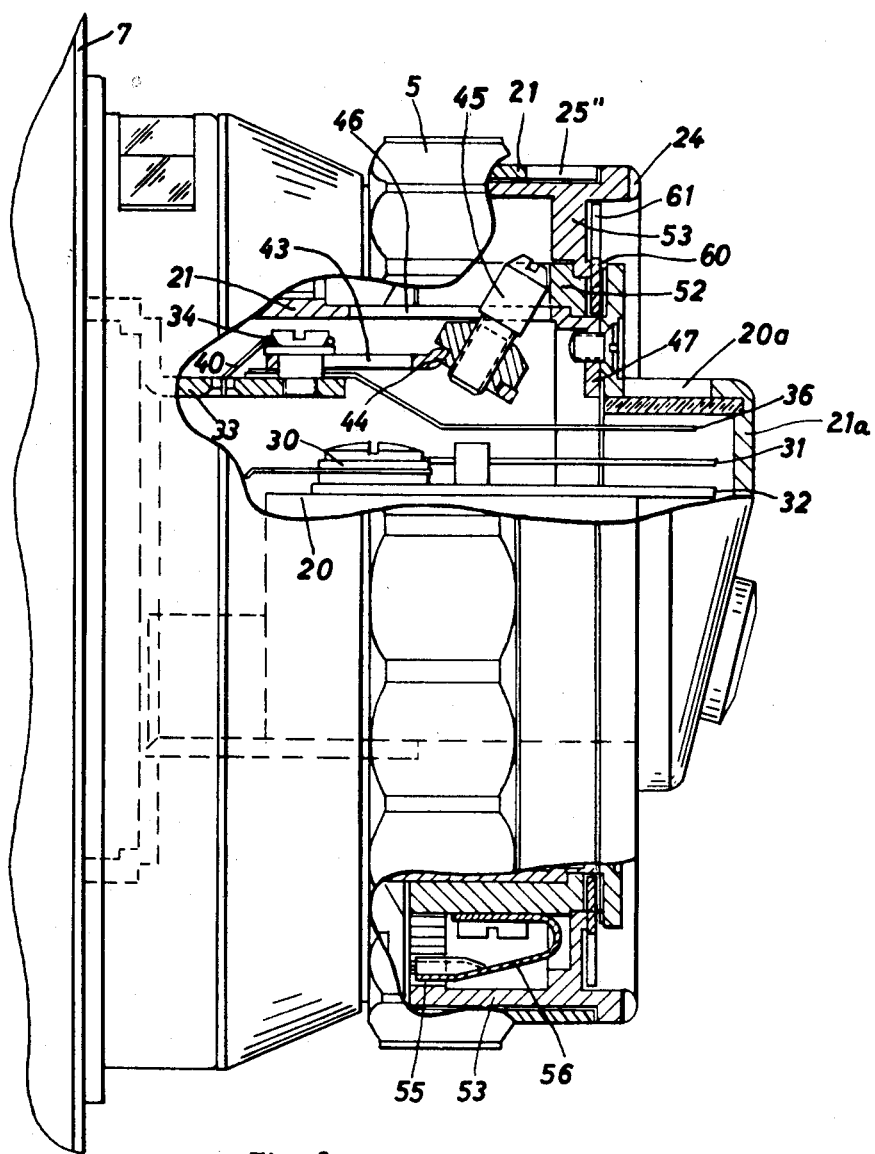
Fig. 6 is a side elevation of the exposure meter, with parts broken away and parts in vertical section, illustrating additional details.

Referring now to Fig. 3 in addition to Fig. 1, the focusing knob 5 is of generally annular shape, and is hollow throughout its axial length. It is rotatably mounted and guided on the side of the camera by means of an annular flange 8 on the knob, which is received within a hollow bearing member mounted on the outer casing or housing 7 of the camera. The focusing shaft 9, which extends in a direction crosswise of the optical axis of the camera and is alined axially with the axis of rotation of the knob 5, carries a crank arm 10 terminating in a driver portion 11 which extends out radially beyond a bayonet connection ring 12 and into a driving slot 26 formed in the knob 5 at the rear edge thereof.

The bayonet connection ring 12 is supported at only one point of its periphery by a web 13 connected to a flange 14 which is rigidly secured by screws 15 to the side wall 2 of the camera body, it being understood that this wall 2 is the main structural support at this side of the camera, whereas the previously mentioned wall 7 (on which the knob 5 is mounted) is an exterior housing or cover plate which covers the structural wall 2. As will be seen from the drawing, the web 13 is relatively small or narrow in a direction circumferentially of the ring 12, subtending only a very minor part of the complete circumference. As well understood by those familiar with "Rolleiflex" cameras, the focusing shaft 9 only needs to be turned somewhat less than one complete revolution, in order to shift the lens carrying front member 4 throughout its complete axial range of movement. The web 13 is designed as a stop to limit the rotation of the shaft 9, the full range of movement thereof being from a position in which the crank arm 10 engages one edge of the web 13, around through slightly less than one complete revolution until the crank arm 10 engages the opposite edge of the web 13.

The bayonet connection ring 12 carries a plurality of bayonet connection lugs 16 (preferably three of them) projecting radially outwardly as shown, in the manner of bayonet connections as commonly used for interchangeable lenses, filters, etc., on photographic cameras. Within the ring 12 there are two electrical contact springs 17 and 18 insulated from each other and from any metallic parts of the camera body. The photoelectric cell of the exposure meter is arranged on the camera body in some suitable place to receive light passing from the object to be photographed toward the camera, the photoelectric cell conveniently and preferably being placed as shown at 19, extending horizontally across the top of the front wall of the camera body, just above the movable front member 4, in the position heretofore occupied by the name plate in previous models of the "Rolleiflex" camera. The two electrical terminals of the photoelectric cell 19 are connected by suitable circuit wires (not shown) to the electric contact springs 17 and 18, respectively.

The indicating instrument itself, or actual meter part of the light meter, is contained in a barrel-shaped or cylindrical instrument housing 21 which fits within the bore extending through the focusing knob 5, the outer end portion of the instrument housing being of larger diameter than the inner end thereof, as shown, and there is a correspondingly enlarged part 22 of the bore through the focusing knob, to accommodate the larger part of the instrument housing.

The inner end of the instrument housing 21 is secured to the bayonet ring 23 having inwardly projecting bayonet claws which engage with the bayonet lugs 16 of the stationary ring 12, to hold the meter in normal mounted position within the focusing knob 5. The housing 21 is held to the bayonet ring 23, for example, by radial screws 48' (Fig. 3) which pass through holes 48 in the housing 21 and into tapped openings 49 in the ring 23.

At the front of the housing 21 there is a rotatable ring 24 having a bearing within the front portion of the housing 21 and rotatable about the axis of the housing. The front edge of this ring 24 is accessible at the front of the instrument, and is knurled for easy grasping and turning, to adjust the meter. The periphery of the ring 24 carries a suitably graduated scale 25, graduated for example in terms of light value or exposure value, for use, for example, with a correspondingly graduated shutter having a light value or exposure value scale such as shown, for instance, in French Patent 1,090,214, published March 29, 1955. This is only an example of one possible form of graduations, for it is within the scope of the present invention to have the scale 25 graduated in any desired units or terms, for use with any desired kind of shutter. The graduations of the scale 25 are read through two sight windows 25' and 25" formed in the housing 21 near the outer end thereof outwardly beyond the focusing knob 5. These sight windows and the particular use of one or the other of them as circumstances demand, will be further mentioned below.

Projecting axially at the outer end of the housing 21, outwardly beyond the end of the adjusting ring 24, is a housing extension 21a having a flat top surface provided with an observation window 20a through which are visible a meter needle or pointer 31, and a follower needle or pointer 36. Both of these needles swing horizontally on vertical pivots, so that the photographer may easily observe the positions of the respective pointers, through the window 20a, while looking downwardly in a general direction toward the focusing screen 6, holding the camera in picture-taking position at waist or chest level.

The pointer 31 is fixed to the upper end of the vertical shaft of a moving coil galvanometer of the kind customarily used in light meters, which is enclosed within the inner casing 20 mounted within the housing 21 and secured to the bayonet ring 23. The coil of the galvanometer is electrically connected to the contact segments 27 and 28 (Fig. 4) mounted on the base plate 29 of insulating material held within the bayonet ring 23, in such position that when the instrument is properly mounted within the focusing knob 5, the contact strips 27 and 28 press against the contact springs 17 and 18 on the camera body, so that the coil of the light meter will receive current from the photocell 19 mounted at the front of the camera body. Thus the position of the pointer 31 at any given instant depends upon the current output produced by the photocell 19.

The other pointer 36 is a follower pointer mounted on the vertical pivot 34 and constantly urged in one direction (a counterclockwise direction when viewed from above as in Fig. 5) by a light spring 39 coiled around the pivot 34, one end 40 of which is fixed to the stationary bracket 33, and the other end 41 of which acts on the pin 38 which is fixed to a lateral extension 37 of the needle 36 and which extends upwardly through a transverse slot in a longitudinally slidable actuator 44 guided by a longitudinal slot 43 which embraces the pivot 34. An upwardly extending pin 45 at the forward end of the actuator slide 44 extends up through a guide slot 46 formed axially in the housing 21, so that the slide 44 can move only in an axial direction with respect to the housing 21 and the axis of rotation of the focusing knob 5.

The upper end of the pin 45 engages a cam surface 54 on a cam ring 52 rotatable about the axis of the instrument, which cam ring is received within and normally turns with the adjusting ring 24 previously mentioned, being coupled thereto with a resilient coupling. An axially extending flange 53 at the inner end of the adjusting ring 24 is provided with internal teeth 55 extending through at least a part of the periphery, which teeth are resiliently engaged by a spring 56 on the cam ring 52, so as to drive the cam ring rotationally from the adjusting ring 24. However, the cam ring has an axially extending lug 59 which engages with a fixed stop in the instrument housing to limit the rotation of the cam ring to slightly less than one complete revolution, whereas the rotation of the adjusting ring 24 is unlimited. Therefore, if the adjusting ring 24 is turned until the lug 59 of the cam ring comes against the fixed stop, and if the adjusting ring is then turned further beyond this point, the driving spring 56 will be caused to slip resiliently over the driving notches 55, whereby it is possible to change the orientation of the cam ring 52 with respect to the adjusting ring 24, to adjust the shutter for different film speeds, filter factors, or other variables. To facilitate such adjustment, there is an appropriate graduated scale marked on the front face of the radial flange near the front of the adjusting ring 24, which scale is visible through one or more observation windows 61 formed in an annular ring 60 which is secured to and turns with the cam ring member 52. If two such observation windows 61 are used, as shown in Fig. 3, the scale read through one window may be marked in one appropriate kind of film speed unit, e.g., according to the A.S.A. system, while the scale read through the other window 61 may be marked according to other film speed units, e.g., the German D.I.N. system.

Rotation of the cam ring causes the cam surface 54 to bear against the pin 45 of the slide 44, to move this slide axially, thereby swinging the pointer 36 on its pivot 34. Thus the adjusting ring 24 can be turned until the action of the cam 54, acting on the pin 45, serves to swing the pointer 36 to any desired position, the correct position being one in which it is alined directly over the meter pointer 31. To assist in obtaining accurate alinement of the two pointers, the follower pointer 36 preferably has its outer end made wider than the pointer 31 and formed with a slot 42, like the eye of a needle, through which slot the meter pointer 31 may be seen when the two pointers are accurately alined with each other.

The photoelectric cell 19 has already been mentioned in general terms in connection with Fig. 1 of the drawings. Referring now to the details of construction, especially in connection with Fig. 2, the main front plate 19 of the cell is provided with an aperture 79 in which is mounted a honeycomb lens 80 secured in a frame 81 which forms one side of a guide for a slide or shutter member 82 which slides upwardly and downwardly into and out of alinement with the photoelectric material 83 spaced behind the honeycomb lens 80 and held in fixed position relative thereto by the hollow rivets 84.

Figure 2:
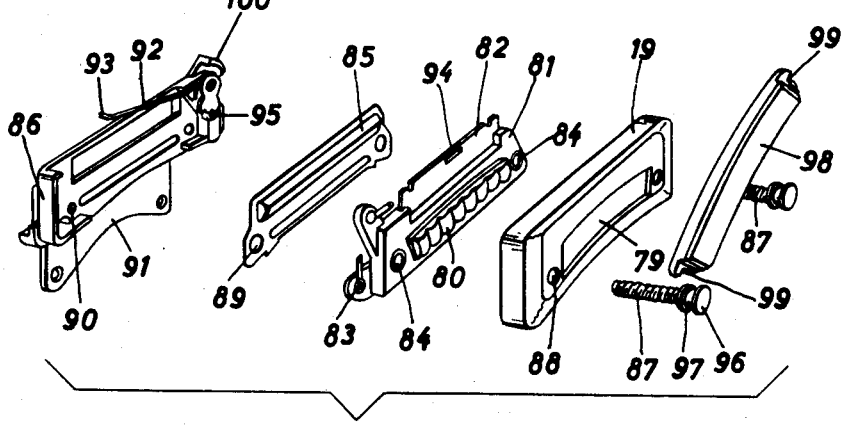
Fig. 2 is an exploded perspective view of the photoelectric cell and its mounting and control parts.

A spring pressure plate 85 is placed behind the members 81, 83 and, when the parts are assembled from the exploded position shown in Fig. 2 to the normal assembled position, these parts 81, 83, 85 are located within a flanged plate housing 86 having forwardly extending lateral flanges which telescope snugly inside the rearwardly extending lateral flanges of the front plate 19.

The parts are all held together in assembled relation by two screws 87 which have heads pressing rearwardly against the front plate 19 and which have threaded shanks extending through holes 88 in the plate 19, through the hollow rivets 84, through alined holes 89 in the spring pressure plate 85, and are screwed into tapped holes 90 in the plate housing 86. Preferably also these screws extend further rearwardly into tapped openings in the front wall of the camera body, to hold the photoelectric cell assembly in place on the camera body, and it may be additionally held thereon by other screws extending through holes at the lower corners of the downwardly extending flange 91 on the plate housing 86.

The shifting of the photocell from one sensitivity range to another sensitivity range is preferably done in accordance with the optical principles disclosed in the copending United States patent application of Hermann Bretthauer, Joachim Mädge, and Wolf Kroger, entitled "Plural Range Masking Means for Photoelectric Measuring Instruments," Serial No. 627,765, filed December 12, 1956 (now abandoned). When the shutter or mask 82 is in its uppermost position, light reaches the photoelectric cell material through all of the sections or subdivisions of the honeycomb lens 80, but when the shutter 82 is in its lower position, light reaches only a fraction of the area of the photoelectric material, through one of the sections of the honeycomb lens 80 and through an opening 82a (Fig. 3) in the shutter. Thus the upper position of the slide or mask 82 is used when the photocell is to have its maximum sensitivity range, the light being relatively dim, and the shutter 82 is moved to its lower position when the sensitivity is to be reduced to the lower range on account of relatively strong light.

The mask 82 is moved upwardly and downwardly between its two positions by manual control means, either from a finger piece located on the photocell assembly itself, or preferably from a finger piece located on the meter assembly. Describing first the control of the shutter from a finger piece on the photocell assembly itself, and referring again to Fig. 2, there is a handle 100 pivotally mounted near the upper corner of the frame 86, which handle carries a radially extending spring 92 having an end bent over at 93 to engage in a slot 94 near the top of the shutter or mask 82. When the handle 100 is swung in a clockwise direction (when viewed as in Fig. 2) on its pivot, the spring wire 92 likewise swings clockwise so that the bent portion 93 is elevated, thus moving the masking member 82 upwardly to the position for maximum sensitivity. When the handle 100 is swung in the opposite direction, counterclockwise when viewed as in Fig. 2, the spring 92 swings downwardly, carrying the shutter 82 downwardly to reduce the sensitivity of the photocell. A spring detent 95 holds the handle 100 in either one of the positions in which it is set, preferably with sufficient force to keep the spring 92 slightly tensioned in either position.

A conspicuous indication, such as a colored spot 101 (Fig. 1) is associated with one position of the manipulating handle, and a corresponding colored spot 102 is associated with one of the two scale windows 25' and 25", thereby indicating which of the windows is to be read with the handle 100 in which position. The indicating spots 101 and 102 may be, for example, brightly colored spots, such as spots of red or other conspicuous color. Preferably the spot 101 is located in such position that it is visible when the handle 100 is in one of its two positions (e.g., in the position for maximum sensitivity) and is covered and obscured by the handle 100 when the handle is in the other of its positions (e.g., the position of lower sensitivity). Thus when the handle 100 is in the position where the indicator 101 is visible, the photographer reads the light meter through the window 25' marked with the corresponding indication or symbol 102.

When the handle 100 is in the other position obscuring the indication 101, then the photographer reads the light meter through the other window 25" which does not carry the colored symbol or marking.

In order to adapt the meter to use as an incident light meter, and to provide a mounting for a protective plate when desired, the heads 96 of the meter attaching screws 87 are provided with peripheral grooves 97 for engaging and retaining lateral lugs 99 on a supplementary member 98, which may be a plain protective covering cap, or may be a diffuser which will convert the light meter to an incident type of meter when the diffuser is in place (held by the grooves 97) in front of the honeycomb lens 80.

Instead of using colored spots for insuring that the correct one of the observation windows will be read when the mask or shutter 82 is in one or the other of its positions, it is preferred to use a shutter for the observation windows 25' and 25" so that only one of these windows is open at a time, and to control the position of the shutter 82 from the shutter for the observation windows. This is accomplished as shown in Figs. 3 and 4, to which reference is now made.

Within the meter casing 21 there is an arcuate shutter member 78 manually controlled by an operating handle 79a which extends out through a circumferential slot in the housing 21 to an accessible external position, so that when the handle 79a is moved in a counterclockwise direction when viewed as in Fig. 3, the shutter 78 covers and blocks the window 25', and when the handle 79a is moved clockwise, the shutter 78 is shifted to cover and block the other observation window 25", the other one of the two windows in each case being open.

This shutter 78 carries a cam for operating on the outer end of a lever 69 pivoted at 68 in the instrument casing 21 and having a rear end which extends out radially through a slot in the casing 21 and is provided with a forked portion 70. When the light meter is in place on its bayonet mounting 12, 16 on the side of the camera, the fork 70 embraces a lug 71 extending radially with respect to a shaft 73 journaled in the web 13 which supports the bayonet mounting ring 12, this lug 71 extending through an opening 72 in the web. The shaft 73 also carries an arm 74 extending radially with respect to the shaft, in a direction opposite to the lug 71, this arm 74 engaging between two slightly spaced pins 75 of a slide member 76 mounted for vertical movement on the side wall of the camera body (inside the outer cover plate or housing plate 7, so that it is not seen in Fig. 1) the slide 76 having a forwardly extending arm 77 having a forked end which engages a pivoted link connected to the photocell shutter or masking member 82.

When the finger piece 79a is moved to the position shown in Fig. 3, the shutter 78 opens the meter observation window 25" and closes the observation window 25', and the cam on the member 78 depresses the outer end of the lever 69, thereby raising the inner end 70 of the lever, and raising the lug 71 on the shaft 73 so that the arm 74 of this shaft is depressed, pulling downwardly on the link 76 and thereby lowering the photocell masking member 82 to shift the photocell to the position of reduced sensitivity. In this position, the meter should be read through the observation window 25", which is the only way that it is now possible to read it (since the other window 25' is closed), thus making mistakes impossible. If operation at higher sensitivity is desired, the finger piece 79a is shifted to close the window 25" and open the window 25', whereupon the cam on the slide 78 raises the outer end of the lever 69, depresses the inner end 70 thereof, thereby depressing the lug 71 on the shaft 73 and raising the slide 76 to raise the photocell mask 82 to the position of maximum sensitivity.

It will be noted that the shape of the fork connection between the parts 70 and 71 does not interfere with rotary movement of the meter assembly on its bayonet mount 12, 16 when the meter assembly is being detached from or attached to the camera.

The construction of the photoelectric cell as shown in Fig. 2 (except for the finger piece 100 and spring 92, etc.) is the same, when the masking member 82 is operated from the shutter 78 by the linkage 69, 73, 76, etc., as when it is operated directly by the finger piece 100. In other words, the various details of construction shown in Fig. 2 (except for the finger piece 100 and the parts 92, 93, 95, etc.) apply to the interconnected linkage form of construction shown in Fig. 3, as well as to the independently movable photocell masking construction employing the finger piece 100.

It should be mentioned at this point that the cam 54 (Fig. 4) extends around most of the periphery of the cam ring 52 (e.g., around 300 degrees of the entire periphery of 360 degrees) and has a single continuous rise (in an axial direction) of sufficient extent to sweep the follow-up pointer 36 over its entire range of travel, which is equal to the entire range of travel of the photocell pointer 31. The scale 25 marked on the flange of the adjusting ring 24 correspondingly extends around most of the periphery of the adjusting ring, e.g., around about 300 degrees of the periphery. The two observation windows 25' and 25" are spaced circumferentially (on the meter housing 21) through a distance equal to the difference in sensitivity of the two ranges of the meter, as measured on the scale 25, and this difference in sensitivity is preferably equal to the full extent or almost the full extent of the scale, with only a relatively slight overlap. With this arrangement, the two windows 25' and 25" will be spaced approximately 300 degrees from each other in a circumferential direction or, in other words, will be about 60 degrees apart, or even slightly closer if the scale 25 is extended through a little more than 300 degrees and the cam 54 is correspondingly extended. It is desirable to have the two windows 25' and 25" spaced not more than about 60 degrees from each other, because this enables both of them to be placed fairly near the top or upper part of the instrument housing 21 (when the housing is in normal assembled position on the camera body) so that both windows can be easily read from above, when the operator is holding the camera in normal picture-taking position at chest level or waist level and looking downwardly toward the focusing screen 6 at the top of the camera body. Thus one of the windows, such as 25", may be placed a little to one side of the extreme top of the circumference of the housing 21, as seen in Fig. 1, and the other window 25' can be placed a little to the other side of the extreme top, both being in a visible position for easy reading along with the reading of the pointers 31 and 36, when the operator is holding the camera and looking downwardly in the manner above mentioned. It is not necessary to turn the camera to other positions in order to make use of the exposure meter.

It may be mentioned also that the axial rise of the cam 54 is in such direction that the pointer 36 is moved in the same direction as the movement of the upper part of the adjusting ring 24. In other words, referring to Fig. 4, the pointer 36 moves in the direction of the arrow B when the adjusting ring 24 correspondingly moves in the direction of the arrow C, and vice versa. This makes it easier and more natural for the operator to move the pointer 36 in the desired direction to make it coincide with the position of the pointer 31.

In using the device, the cam ring 52 is first set in proper adjusted position with respect to the manual adjusting ring 24, in accordance with the film speed of the particular film with which the camera is loaded, observed on the film speed scale through the windows 61, making proper allowance for filter factor, if any. Then the camera is pointed to the scene to be photographed, so that the photocell 19 receives light from such scene, and the electric current produced by the photoelectric cell will cause the pointer 31 of the meter to assume a certain position. Then the operator turns the adjusting ring 24, readily accessible to his left hand (the same hand which normally turns the focusing knob 5) until the follower pointer 36 is brought into alinement with the meter pointer 31, a fine adjustment being easily possible by observing the meter pointer 31 through the slot 42 in the follower pointer 36. When these two pointers are in alinement with each other, the operator then shifts his glance from the window 20a, through which the pointers were visible, to the window 25' or 25" as the case may be (depending upon whether the meter is being used in high sensitivity range or low sensitivity range, respectively) and observes the graduations on the scale 25 visible through the proper observation window. The operator then adjusts the shutter of the camera in accordance with the graduations on the scale 25, such adjustment of the shutter being possible, in a camera of the particular kind above mentioned, without shifting the camera from picture-taking position.

All of this can be done very quickly because it is not necessary to change the position of the camera while performing any of the steps above mentioned, except the initial setting to the proper film speed or filter factor. As already indicated, the camera is held in the usual picture-taking position, with the operator looking downwardly toward the focusing screen 6 at the top of the camera. With simply a slight motion of his eyes, without moving the camera itself, the operator can readily see the relative positions of the two pointers 31 and 36 through the window 20a, and can then readily see the resulting value indications given by the meter on the scale 25, through the window 25' or 25" as the case may be. If it is desired to use the other sensitivity range, this can be quickly done by shifting the finger piece 100, or the finger piece 79a, depending upon which form of construction is used.

The construction is particularly satisfactory from the standpoint of compactness, since most of the structure is built into the space within the focusing knob, which would otherwise be wasted. The meter structure projects only a slight distance axially beyond the end of the normal focusing knob, so presents no particular space problem. In a camera of this kind, where practically all of the available space is already occupied by various necessary parts or mechanisms, it is quite difficult to find additional space for mounting an exposure meter, but the present construction obviates this difficulty by mounting the meter in the focusing knob, in a manner which does not interfere with carrying the camera in the customary carrying cases already available.

The placing of the meter in the focusing knob and the attachment thereof to the camera by the bayonet joint connection constitute the sole invention of Karl Rander, one of the joint applicants of the present application, and so these features are not claimed herein, but are claimed in the copending United States patent application of Karl Rander, Serial No. 633,881, filed January 14, 1957, now Patent 2,909,108, granted October 20, 1959. Other features as claimed in this present application are the joint invention of the joint applicants named herein.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photoelectric exposure meter comprising photocell circuit means having at least two sensitivity ranges and including an electrically controlled pointer, a mechanically controlled pointer arranged to be moved into alinement with said electrically controlled pointer, a manually operable cam mounted for rotary adjustment, means for limiting said rotary adjustment to the major portion of a single revolution, means for operatively connecting said cam and mechanically controlled pointer so that said mechanically controlled pointer assumes an angular position dependent on the rotary position of said cam, said cam having a single continuous rise corresponding to the movement of said mechanically controlled pointer in one direction across its entire range of travel, a single graduated scale connected to said cam to turn therewith for use in both of said two sensitivity ranges, means for obscuring most of said scale and for defining at least two circumferentially spaced reading windows for reading said scale, one of said windows serving for reading said scale when said photocell circuit means is operated at one of said sensitivity ranges and another of said windows serving for reading said scale when said photocell circuit means is operated at another of said sensitivity ranges, said windows being spaced by a distance determined by the difference of response of said electrically controlled pointer to the same intensity of light for each of said two sensitivity ranges so as to obtain the same scale value successively in each of said two windows at both of said two sensitivity ranges.

2. A construction as defined in claim 1, further including means for changing the range of sensitivity at which said photocell circuit means is operated, and means located adjacent at least one of said windows for visually indicating which of said windows is to be used when said sensitivity changing means is in a given position.

3. A construction as defined in claim 1, further including means for changing the range of sensitivity at which said photocell circuit means is operated, and means for indicating which of said windows is to be used when said sensitivity changing means is in a given location, said indicating means comprising shutter means alternately masking one of said windows while leaving the other of said windows open for reading said scale, said shutter means being coupled with said sensitivity changing means.

4. A construction as defined in claim 1, in which said scale has a single continuous series of values successively passing said windows throughout rotary movement of said cam through a major portion of a single revolution.

5. A photoelectric exposure meter comprising photocell circuit means having two sensitivity ranges and including an electrically controlled pointer, a mechanically controlled follow-up pointer arranged to be moved into alinement with said electrically controlled pointer, a manually operable cam mounted for rotary adjustment, means for limiting said rotary adjustment to the major portion of a single revolution, means for operatively coupling said cam and mechanically controlled pointer so that said mechanically controlled pointer assumes an angular position dependent on the rotary position of said cam, said cam having a single continuous rise corresponding to the movement of said mechanically controlled pointer in one direction across its entire range of travel, a single circumferentially graduated exposure value scale connected to said cam to turn therewith, means for obscuring most of said scale and defining two windows spaced circumferentially so as to be readable from a single direction for reading said scale, one of said windows serving for reading said scale when said photocell circuit means is operated at one of said sensitivity ranges and the other of said windows serving for reading said scale when said photocell circuit means is operated at the other of said sensitivity ranges, said windows being spaced by a distance corresponding to the difference in sensitivities between said ranges, means for changing the range of sensitivity at which said photocell circuit means is operated, and means for indicating which of said windows is to be used when said sensitivity range changing means is in a given location.

References Cited in the file of this patent

UNITED STATES PATENTS

| | | |
|---|---|---|
| 2,048,655 | Hineline | July 21, 1936 |
| 2,252,573 | Leitz et al. | Aug. 12, 1941 |
| 2,360,256 | Mihalyi | Oct. 10, 1944 |
| 2,766,654 | Stimson et al. | Oct. 16, 1956 |

FOREIGN PATENTS

| | | |
|---|---|---|
| 625,988 | Great Britain | Apr. 2, 1941 |